Figure 1:
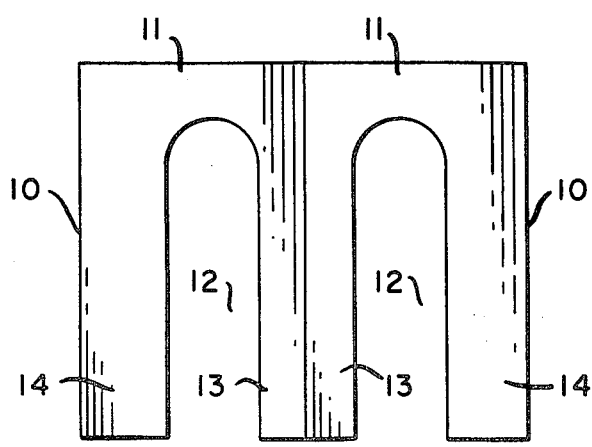

United States Patent [19]

Nelson

[11] Patent Number: 4,485,607
[45] Date of Patent: Dec. 4, 1984

[54] METHOD OF SHIMMING SPACED MEMBERS

[75] Inventor: Terry L. Nelson, Fairfield, Conn.

[73] Assignee: The Leake & Nelson Co., Bridgeport, Conn.

[21] Appl. No.: 572,502

[22] Filed: Jan. 20, 1984

Related U.S. Application Data

[62] Division of Ser. No. 410,244, Aug. 23, 1982, abandoned.

[51] Int. Cl.³ .............................................. E04B 1/00
[52] U.S. Cl. ...................................... 52/741; 52/126.1
[58] Field of Search ................. 52/126.5, 126.3, 126.1, 52/741, 235

[56] References Cited

U.S. PATENT DOCUMENTS 1,748,412  2/1930  Crawford .
2,431,342 11/1947  Perkins .
2,815,997 12/1957  Korb ............................. 52/126.5 X
2,943,716  7/1960  Babcock ........................ 52/126.1 X
4,435,927  3/1984  Umezu et al. .................... 52/235 X Primary Examiner—Carl D. Friedman
Attorney, Agent, or Firm—Thomas L. Tully

[57] ABSTRACT

Shim elements or spacers designed for use in side-by-side relation between structural steel beams and hanger assemblies which are united by means of pairs of variably-spaced bolts. Each shim element comprises a flat, U-shaped rectangular plate element having leg extensions of different widths and lengths and a central recess adapted to receive a structural bolt. The invention involves providing a universal shim element which is useful in pairs in any one of three different distances by which structural steel-uniting bolts are conventionally separated.

8 Claims, 5 Drawing Figures

U.S. Patent  Dec. 4, 1984  4,485,607

METHOD OF SHIMMING SPACED MEMBERS

This is a division of application Ser. No. 410,244, filed Aug. 23, 1982 abandoned.

BACKGROUND OF THE INVENTION

The present invention relates to shim elements or spacers, particularly to such elements designed for use between structural steel beams and hanger assemblies which have aligned pairs of bolt-receiving passages or holes through which bolts are passed and fastened for purposes of uniting the beams, girders or plates to each other or to other structural members.

It is common practice in the structural steel building trade to insert shim elements between steel beams and hangers or suspended units, before such elements are bolted together, in order to level the continuous member of the hung unit since some small difference is generally encountered even though the steel parts are produced with the best possible precision. In many instances, it is necessary to insert a plurality of superposed shim elements. For the best results, the shim elements should be U-shaped and comprise spaced legs and a central recess. Such shim elements are slipped between the beams and hangers with one leg on each side of each bolt so that each bolt is received within a shim recess. Thus, when the bolts are tightened the shim support evenly surrounds each bolt.

Structural steel bolt holes are conventionally precision-spaced from each other by a distance of 2½ inches, 3 inches or 3½ inches, depending upon the size of the steel beams or girders being used. In order to be used in side-by-side close relation, without overlapping, it has been necessary to stock a plurality of different-sized shim elements, each element having legs of the same width and the width of said legs increasing with the size of the elements to accommodate bolts spaced by different distances. This has been expensive and burdensome.

It is not acceptable to use shims having narrow legs for all applications because, while such shims fit in all applications, they are spaced from each other in side-by-side relation by too great a distance when the bolts are spaced by more than the minimum spacing, i.e., by more than 2½ inches. While it is not necessary that the shims contact each other, any spacing therebetween must not exceed about ¼ inch in order to satisfy bearing requirements and structural specifications.

SUMMARY OF THE INVENTION

The present invention involves the discovery of a novel universal shim element which comprises a flat, U-shaped body member having two leg extensions of different widths and a central recess therebetween, shim element being designed for use in side-by-side relation with an identical shim element in any one of three different configurations to provide a distance between the center of the two recesses corresponding to 2½ inches, 3 inches and 3½ inches, as required to accommodate bolts, the centers of which are conventionally spaced by corresponding distances.

THE DRAWING

Figure 2:
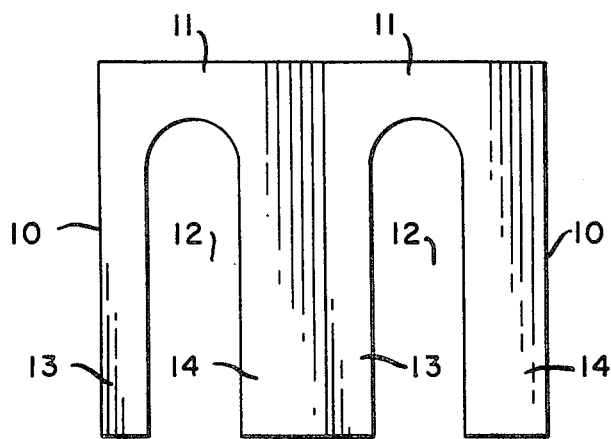
Figure 3:
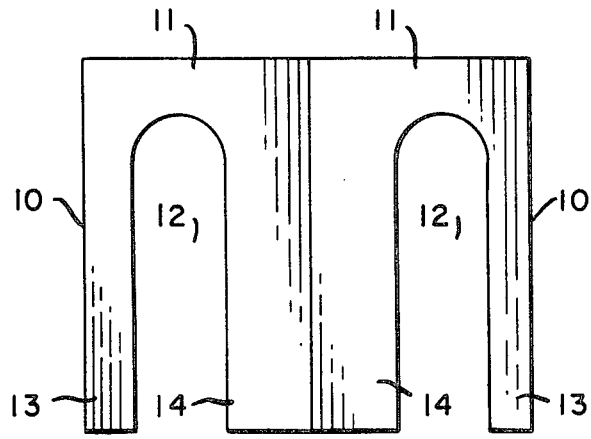
Figure 4:
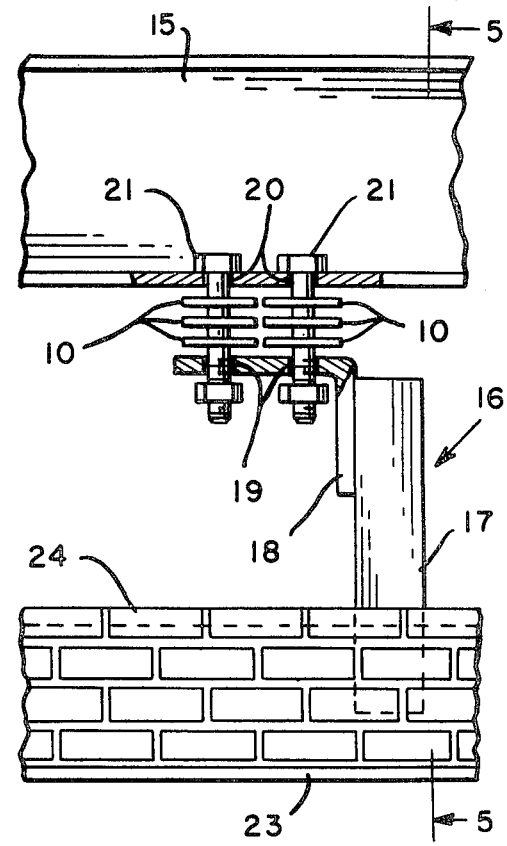
Figure 5:
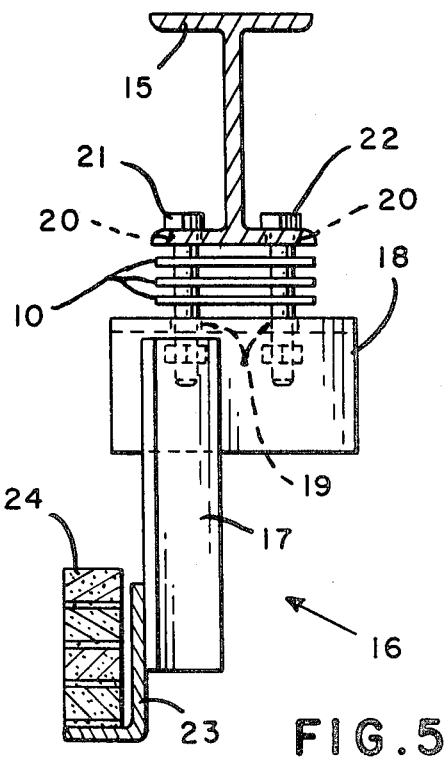

FIGS. 1, 2 and 3 of the accompanying drawing illustrate pairs of identical shim elements according to one embodiment of the present invention, which shim elements are assembled side-by-side in the three possible configurations to provide shim pairs having bolt-receiving recesses, the centers of which are precisely spaced by distances of 2½ inches, 3 inches and 3½ inches, respectively, and FIGS. 4 and 5 illustrate a structural steel girder or I-beam attached to a supported hanger member by means of bolts and having interposed therebetween three pairs of the present shim elements in side-by-side relation.

Referring to FIGS. 1 to 3, the shim elements 10 thereof comprise rectangular flat sheets of uniform predetermined thickness, such as steel sheets having a thickness of 1/16 inch, ⅛ inch, 3/16 inch, as required. The elements 10 comprise a body or handle portion 11 and an offset longitudinal recess or slot 12 which extends into the major portion of the length of the element to produce opposed leg extensions 13 and 14 of different widths on each side of the slot 12.

While the dimensions of the shim element can be varied somewhat, the preferred width of the bolt-receiving slot 12 is 1¼ inch in order to accommodate bolts having conventional diameters of ¾ inch, ⅞ inch and 1 inch, with some room for variations in bolt hole spacing, etc. Thus, when the width of the slot 12 is 1¼ inches, the width of each shim element 10 of FIGS. 1 to 3 is 3 inches and the width of each narrow leg extension 13 is about ⅝ inch and the width of each wide leg extension 14 is about 1⅛ inch.

As shown in FIG. 1, a pair of shim elements 10 is aligned in side-by-side relation with one of the elements 10 reversed so that the narrow leg extensions 13 contact each other. The precise distance between the centers of the bolt-receiving slots 12 is 2½ inches, as indicated.

In FIG. 2 an indentical pair of shim elements 10 is aligned in side-by-side relation so that the wide leg extension 14 of one element 10 is in contact with the narrow leg extension 13 of the other element 10. The precise distance between the bolt-receiving slots 12 is 3 inches, as indicated.

FIG. 3 shows the identical shim elements 10 aligned in side-by-side relation with one of the elements 10 reversed so that the wide leg extensions 14 of both elements 10 are in contact. The precise distance between the centers of the bolt-receiving slots 12 is 3½ inches, as indicated.

As can be seen from FIGS. 1 to 3, a single universal shim element 10 is provided which enables the user to assemble pairs thereof in any one of the three possible side-by-side configurations to accommodate structural bolts of any of the conventional sizes and any of the conventional spacings. This reduces the inventory of different shim elements which must be kept by the assemblers. However, as with conventional shim elements, it is preferred to provide the present shim elements in a variety of thicknesses such as 1/16 inch, ⅛ inch and 3/16 inch, and in a plurality of lengths, such as 2½ inch, 5 inch, 6 inch and 8 inch in order to adapt them for use in the smallest number of superposed elements to fill a gap between structural members and for use between structural members of different sizes or widths. If desired, the shim elements 10 may be made in the maximum length, i.e., 8 inches, and weakened break-away sections may be provided along the length of the leg extensions to enable the user to break off portions to provide elements having a length of 6 inches, 5 inches or 2½ inches, as desired.

FIGS. 4 and 5 illustrate a conventional girder-hanger assembly used to support a facing such as a brick wall on a building, the elements being shown in spaced relation for purposes of illustration. The girder 15 supports a plurality of spaced hangers 16, each of which comprises a vertical L-beam 17 to which is welded a top horizontal connection plate 18 which is provided with four bolt holes 19 which are uniformly spaced for alignment with four correspondingly-spaced bolt holes 20, two of which are present on each of the opposed lower flanges of the girder 15.

Pairs of bolts 21 and 22 are inserted into the pairs of aligned holes 19-20 on each side of the girder 15 and secured with nuts to tighten the attachment of each hanger assembly 16 to the girder 15. Each of the vertical L-beams 17 of the spaced hangers 16 is welded to a lower horizontal support beam 23 which is an element of the hanger assembly and is designed to support a facing material such as a brick wall 24 in level position.

FIGS. 4 and 5 illustrate the presence of three pairs of superposed shims 10 inserted side-by-side between the girder 16 and the connection plate 18 of a hanger 16 in order to space these members by a distance required to render the lower horizontal support beam 23 perfectly level. In some instances, no shim pairs are required and in other instances, a plurality of shim pairs are required.

The holes 19 and 20 are spaced from the other holes 19 and 20 by a distance of $2\frac{1}{2}$ inches, 3 inches or $3\frac{1}{2}$ inches, on center. Depending upon the particular spacing, each shim pair is placed side-by-side as shown in FIGS. 1, 2 or 3 and is inserted by means of handle portions 11 so that the slot 12 of each one receives a bolt 21 and a bolt 22. Each of the three superposed pairs of shims 10 is inserted in the same manner but generally, all of the shims are inserted simultaneously. After the shims are properly positioned, the adjacent sides of the shims of each pair will be in contact with each other or will be spaced only slightly, due to their novel structure. Finally, the nuts are tightened onto the bolts 21 and 22 to secure the assembly.

As will be apparent to those skilled in the art, the present shim elements may be formed from any material suitable for use in the particular application for which the elements are required. Mild carbon steel is a preferred material for structural applications. However, ordinary steel, aluminum or other metals, and even strong plastics such as nylon, Teflon, polyethylene and styrene can be used for certain applications.

It will also be apparent that the dimensions of the shim elements may be varied without departing from the scope of the present invention. For example, the width of the bolt-receiving slot 12 may be about $\frac{7}{8}$ inch or about 1 inch for use with bolts of $\frac{3}{4}$ inch or $\frac{7}{8}$ inch diameter, respectively. In such cases the widths of the narrow and wide leg extensions 13 and 14 will be increased equally in order to provide the required distance of $2\frac{1}{2}$ inches, 3 inches and $3\frac{1}{2}$ inches between the centers of the slots of such shim elements having narrower slots. In all cases, where a spacing of $2\frac{1}{2}$ inches, 3 inches and $3\frac{1}{2}$ inches between the centerpoint of the slots of aligned shim elements having a width of 3 inches is desired, the distance between the center of the slot 12 and the side of the rectangular sheet having the narrow leg extension 13 will be $1\frac{1}{4}$ inch (one-half of the desired minimum spacing of $2\frac{1}{2}$ inches) and the distance between the center of the slot 12 and the side having the wider leg extension will be $1\frac{3}{4}$ inch (one-half of the desired maximum spacing of $3\frac{1}{2}$ inches).

Variations and modifications of the present invention will be apparent to those skilled in the art within the scope of the present claims.

I claim:

1. A method for shimming the spacing between two members which are to be attached to each other by a pair of bolts, the centers of which are spaced by any one of three standard distances, which comprises providing pairs of identical thin, flat, rectangular shim elements of uniform thickness, each having a single slot which extends parallel to the side edges thereof in a direction perpendicular to the width of said shim element and which is offset relative to the center of said shim element so as to form a uniformly wide leg extension along one side edge of said slot and a uniformly narrow leg extension along the other side edge of said slot, the width of said slot being greater than the thickness of said bolts, aligning pairs of said shim elements in edge-by-edge contact, with the slots extending parallel to each other and in the same direction, in any one of three positions in which the narrow leg extensions are adjacent or a narrow leg extension is adjacent a wide leg extension or the wide leg extensions are adjacent, to space the centers of the slots of each pair of aligned shim elements from each other by any one of three standard distances corresponding to the distance between the centers of said pairs of bolts, inserting one or more pairs of aligned shims between said members to be shimmed so that each said bolt is received within a said slot, and tightening said bolts to attach said members in shimmed relation to each other.

2. The method according to claim 1 in which each said shim element comprises steel.

3. The method according to claim 1 in which the thickness of each said shim element is between about 1/16 inch and 3/16 inch.

4. The method according to claim 1 in which each said shim element has a length greater than its width.

5. The method according to claim 1 in which the width of each said shim element is about 3 inches and the length of each said shim element is between about $2\frac{1}{2}$ inches and 8 inches.

6. The method according to claim 1 in which the width of said slot is between about $\frac{7}{8}$ inch and $1\frac{1}{4}$ inch.

7. The method according to claim 6 in which the width of said slot is about $1\frac{1}{4}$ inch.

8. The method according to claim 1 in which the distance between the center of the slot and the side of the shim element having the narrow leg extension is about $1\frac{1}{4}$ inch and the distance between the center of the slot and the side of the shim element having the wide leg extension is about $1\frac{3}{4}$ inch.

* * * * *